United States Patent
Umehara et al.

(10) Patent No.: US 10,164,232 B2
(45) Date of Patent: Dec. 25, 2018

(54) MANUFACTURING METHOD AND MANUFACTURING APPARATUS OF ELECTRODE BODY

(71) Applicant: TOYOTA JIDOSHA KABUSHIKI KAISHA, Toyota-shi, Aichi (JP)

(72) Inventors: Masakazu Umehara, Toyota (JP); Takahiro Kuhara, Toyota (JP); Shingo Komura, Nagakute (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 115 days.

(21) Appl. No.: 15/270,501

(22) Filed: Sep. 20, 2016

(65) Prior Publication Data

US 2017/0084897 A1    Mar. 23, 2017

(30) Foreign Application Priority Data

Sep. 21, 2015  (JP) .................. 2015-186133

(51) Int. Cl.
| | |
|---|---|
| *H01M 2/16* | (2006.01) |
| *H01M 4/04* | (2006.01) |
| *H01M 10/04* | (2006.01) |
| *H01M 10/0585* | (2010.01) |

(52) U.S. Cl.
CPC ......... *H01M 2/1673* (2013.01); *H01M 4/043* (2013.01); *H01M 4/0471* (2013.01); *H01M 10/0468* (2013.01); *H01M 2/1653* (2013.01); *H01M 10/0585* (2013.01)

(58) Field of Classification Search
CPC ............. H01M 2/1673; H01M 2/1653; H01M 2/1646; H01M 2/16
See application file for complete search history.

(56) References Cited

U.S. PATENT DOCUMENTS

| | | | |
|---|---|---|---|
| 6,416,559 B1 | | 7/2002 | Matsumura et al. |
| 2004/0253504 A1* | | 12/2004 | Mossnnan ............. H01M 4/861 |
| | | | 429/434 |
| 2012/0015228 A1* | | 1/2012 | Yoon ..................... H01M 2/162 |
| | | | 429/144 |
| 2013/0309566 A1 | | 11/2013 | Umehara |
| 2017/0084903 A1 | | 3/2017 | Umehara |

FOREIGN PATENT DOCUMENTS

| | | |
|---|---|---|
| CN | 1274178 A | 11/2000 |
| CN | 103339766 A | 10/2013 |
| JP | 2000-188099 A | 7/2000 |
| JP | 2006-324095 A | 11/2006 |

\* cited by examiner

*Primary Examiner* — Christopher T Schatz
(74) *Attorney, Agent, or Firm* — Sughrue Mion, PLLC (57) ABSTRACT

An electrode body comprising a positive electrode mixture layer, a negative electrode mixture layer, and a thermoplastic-resin separator layer interposed therebetween is manufactured. A manufacturing method of the electrode body includes a preprocessing step of preprocessing a portion to be cut in a long-strip shaped integrated structure in which the separator layer as an accumulated layer of resin particles are interposed at least between the positive and negative electrode mixture layers such that the positive electrode mixture layer, the negative electrode mixture layer, and the separator layer are lowered their volume porosities to 10 to 20%, 10 to 20%, and 5% or less, respectively, and a cutting step of cutting the portion of the long-strip shaped integrated structure having been lowered the volume porosity by a cutting blade.

6 Claims, 12 Drawing Sheets

MANUFACTURING METHOD AND MANUFACTURING APPARATUS OF ELECTRODE BODY

CROSS-REFERENCE TO RELATED APPLICATIONS

This application is based upon and claims the benefit of priority from the prior Japanese Patent Application No. 2015-186133 filed on Sep. 21, 2015, the entire contents of which are incorporated herein by reference.

BACKGROUND

The present disclosure relates to a manufacturing method and a manufacturing apparatus of an electrode body including a positive electrode mixture layer, a negative electrode mixture layer, and a separator layer interposed therebetween. To be more specific, the present disclosure relates to a manufacturing method and a manufacturing apparatus of an electrode body using an accumulated layer of particles made of thermoplastic resin as a separator layer.

Heretofore, most of secondary batteries and other batteries have a structure in which an electrode body is enclosed in a battery case. The electrode body typically includes a positive electrode mixture layer and a negative electrode mixture layer inside the body. The positive electrode mixture layer contains positive active material and the negative electrode mixture layer contains negative active material. A separator layer is interposed between the positive electrode mixture layer and the negative electrode mixture layer to prevent direct contact of those positive and negative electrode mixture layers.

A manufacturing process for manufacturing the above mentioned electrode body includes a cutting process in some cases as described in Patent Document 1. According to the technique in Patent Document 1, "a positive electrode raw strip" and "a negative electrode raw strip" are laminated with interposing "a separator raw strip" so that "a battery laminated body raw strip" is obtained. In the cutting process, this "battery laminated body raw strip" is cut into two pieces by a cutting blade. Thus, two electrode bodies are obtained from one "battery laminated body raw strip."

RELATED ART DOCUMENTS

Patent Documents

Patent Document 1: JP-A-2000-188099

SUMMARY

In recent years, instead of a long strip-shaped separator raw strip which has been used in the technique of Patent Document 1, an accumulated layer of particles made of thermoplastic resin has become used as a separator layer. When this type of separator layer is cut by a cutting method of the Patent Document 1, there is a case that the positive electrode mixture layer and the negative electrode mixture layer short in a cut position. The separator layer formed out of an accumulation of the particles is more fragile as a layer than a film-like raw strip. As a result of this fragility, the separator layer in the cut position and its vicinity could be broken by the stress caused by entering of the cutting blade. The cut position is further subjected to the stress directly by the cutting blade, and as a result, fragments of the separator layer could be mixed with constituent particles of the positive and negative electrode mixture layers. This mixture causes the above mentioned short circuit.

The present disclosure has been made to solve the above problems of the conventional technique. Specifically, the present disclosure has been made to provide an electrode body manufacturing method and an electrode body manufacturing apparatus utilizing an accumulated layer of particles made of thermoplastic resin as a separator layer to appropriately prevent short circuit between a positive electrode mixture layer and a negative electrode mixture layer even in a cut position of the electrode body.

One aspect of the present disclosure is a manufacturing method of an electrode body, the electrode body comprising a positive electrode mixture layer, a negative electrode mixture layer, and a thermoplastic-resin separator layer placed therebetween, wherein the manufacturing method includes: a feeding step of feeding a long-strip shaped integrated structure comprising the positive electrode mixture layer, the negative electrode mixture layer, and the separator layer formed by accumulation of thermoplastic-resin particles, the separator layer being placed at least between the positive and negative mixture layers; a preprocessing step of preprocessing a portion to be cut in the long-strip shaped integrated structure such that the positive electrode mixture layer, the negative electrode mixture layer, and the separator layer are lowered their volume porosities to 10 to 20%, 10 to 20%, and 5% or less, respectively; and a cutting step of cutting the portion of the long-strip shaped integrated structure, which has been lowered the volume porosity in the preprocessing step, by a cutting blade.

In the above mentioned manufacturing method of the electrode body, a volume porosity of each of the positive electrode mixture layer, the negative electrode mixture layer, and the separator layer is lowered in the preprocessing step prior to the cutting step. These layers are thus made to become more compact and increased their rigidity to some extent. Especially, the separator layer formed by the accumulated layer of thermoplastic-resin particles is typically easy to be broken in the cutting step, but the separator layer is made to endure the cutting step by the application of the preprocessing step. Cutting is performed in this preprocessed portion in the cutting step, and accordingly, the cut portion can be prevented from collapse in its layer structure and prevented from short circuit.

Another aspect of the present disclosure is a manufacturing apparatus of an electrode body comprising: a feeding part configured to feed a long-strip shaped integrated structure including a positive electrode mixture layer, a negative electrode mixture layer, and a separator layer formed by accumulation of thermoplastic-resin particles, the separator layer being placed at least between the positive and negative mixture layers; a preprocessing part configured to preprocess a portion to be cut in the long-strip shaped structure having been fed by the feeding part such that the positive electrode mixture layer, the negative electrode mixture layer, and the separator layer are lowered their volume porosities to 10 to 20%, 10 to 20%, and 5% or less, respectively; and a cutting part configured to cut the portion of the long-strip shaped integrated structure, which has been lowered the volume porosity in the preprocessing part, by a cutting blade.

DETAILED DESCRIPTION OF THE EXEMPLARY EMBODIMENTS

A detailed explanation of the present embodiment exemplifying the present disclosure is now given with reference to the accompanying drawings. In the present embodiment, as a starting material for producing an electrode body, an electrode plate in which a positive electrode and a negative electrode are formed integrally (hereinafter referred as "an integrated electrode plate") is employed. An integrated electrode plate 1 used in the present embodiment has a sectional structure as shown in FIG. 1.

Figure 1:
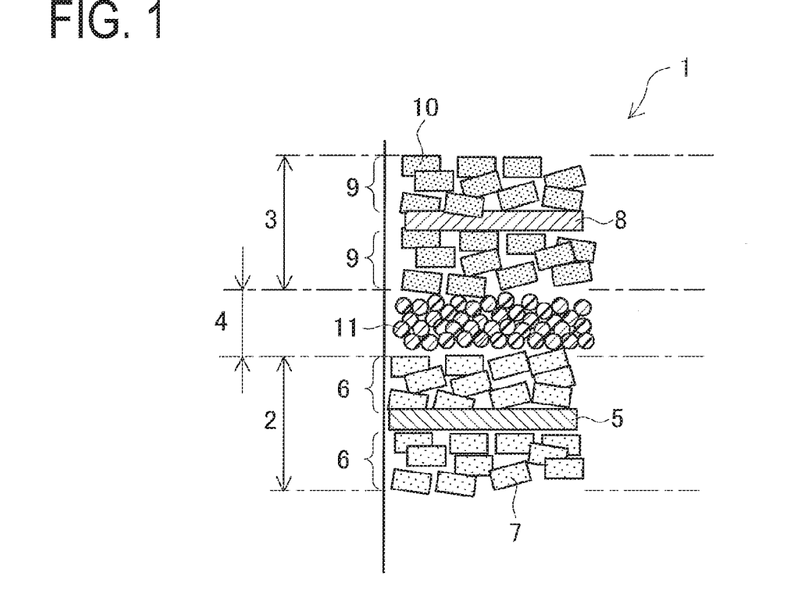
FIG. 1 is a sectional view of an integrated electrode plate used in the present embodiment.

The integrated electrode plate 1 in FIG. 1 is formed by integrally laminating a negative electrode plate 2 and a positive electrode plate 3 interposed with a separator layer 4. The negative electrode plate 2 is constituted of a negative current collecting foil 5 and negative electrode mixture layers 6 formed on both surfaces of the negative current collecting foil 5. The negative electrode mixture layers 6 are formed by accumulating negative active material particles 7. The positive electrode plate 3 is constituted of a positive current collecting foil 8 and positive electrode mixture layers 9 formed on both surfaces of the positive current collecting foil 8. The positive electrode mixture layers 9 are formed by accumulating positive active material particles 10. The separator layer 4 is formed by accumulating resin particles 11. The resin particles 11 are particles made of thermoplastic resin. The negative electrode mixture layers 6 and the positive electrode mixture layers 9 are substantially added with additives such as a binder and a conducting agent as well as the respective active material particles.

Figure 2:
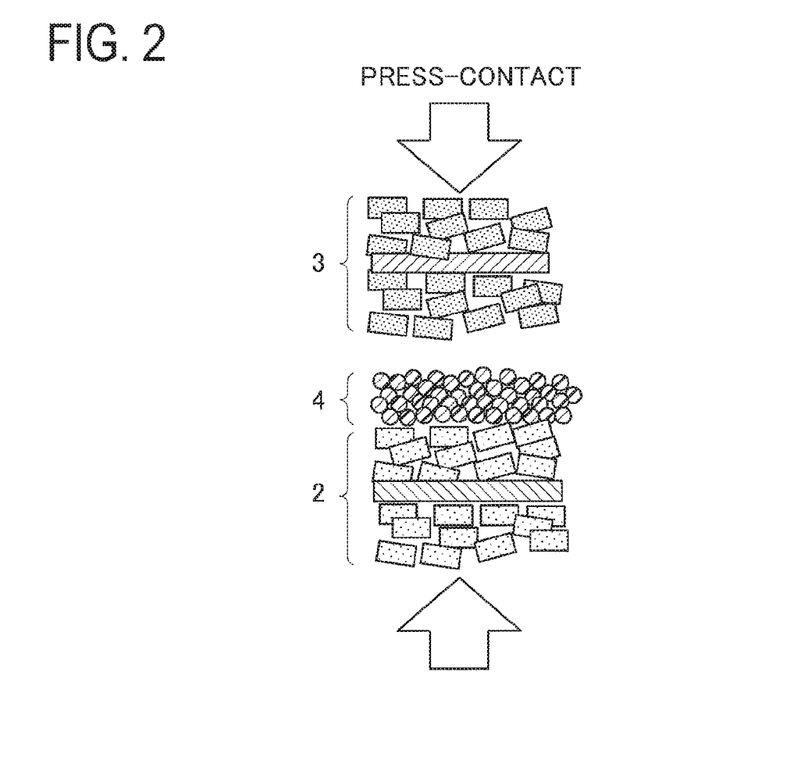
FIG. 2 is a sectional view showing a step of press-contacting a negative electrode plate formed with a separator layer and a positive electrode plate to form the integrated electrode plate.
Figure 3:
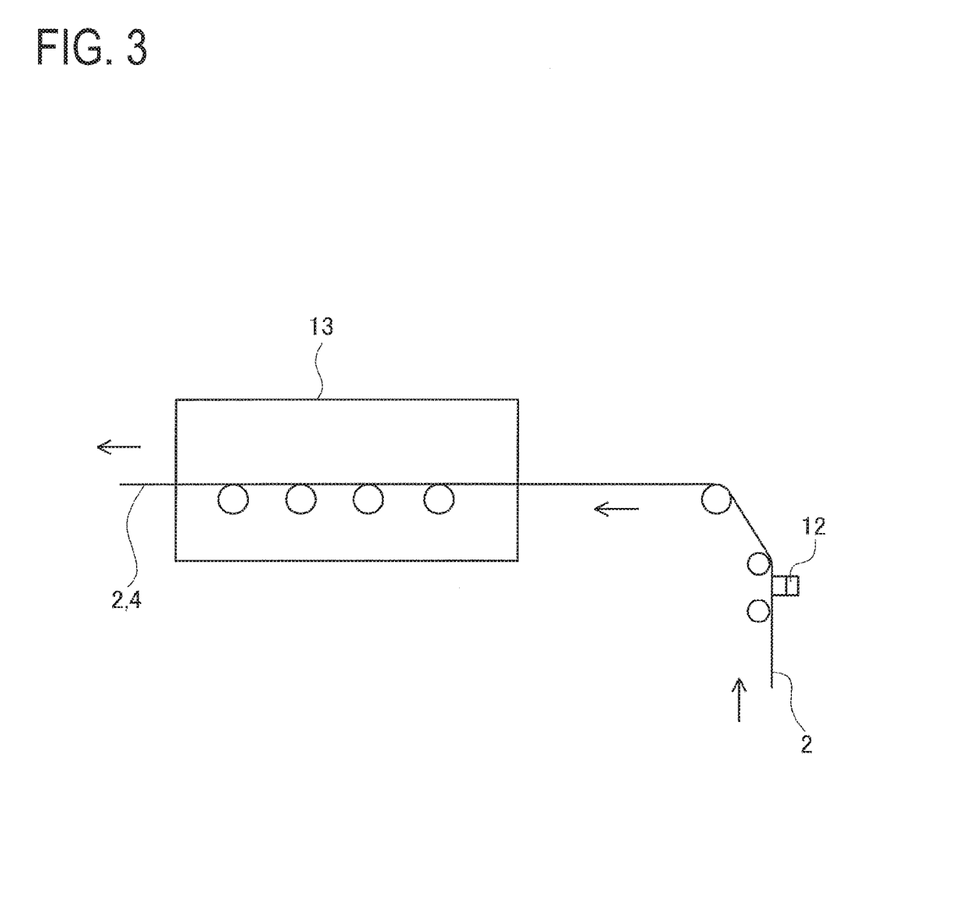
FIG. 3 is a schematic view showing a process of forming the separator layer on the negative electrode plate.

The integrated electrode plate 1 is, as shown in FIG. 2, typically produced by press-contacting and sticking the negative electrode plate 2 formed with the separator layer 4 and the positive electrode plate 3. At this time, the electrode plates are stuck in a manner that the separator layer 4 is placed intermediate between the electrode plates. The negative electrode plate 2 formed with the separator layer 4 is produced by steps of applying coating on the negative electrode plate 2 by a coating device 12 and drying in a drying furnace 13 as shown in FIG. 3. What is coated on the negative electrode plate 2 by the coating device 12 is dispersion liquid made of the resin particles 11 which are dispersed in a solvent. FIG. 3 illustrates a process of applying coating on a one-side surface, but alternatively, both surfaces of the negative electrode plate 2 may by applied with coating of the separator layer 4. Further alternatively, the separator layer 4 may be formed on the positive electrode plate 3 instead of the negative electrode plate 2.

Figure 4:
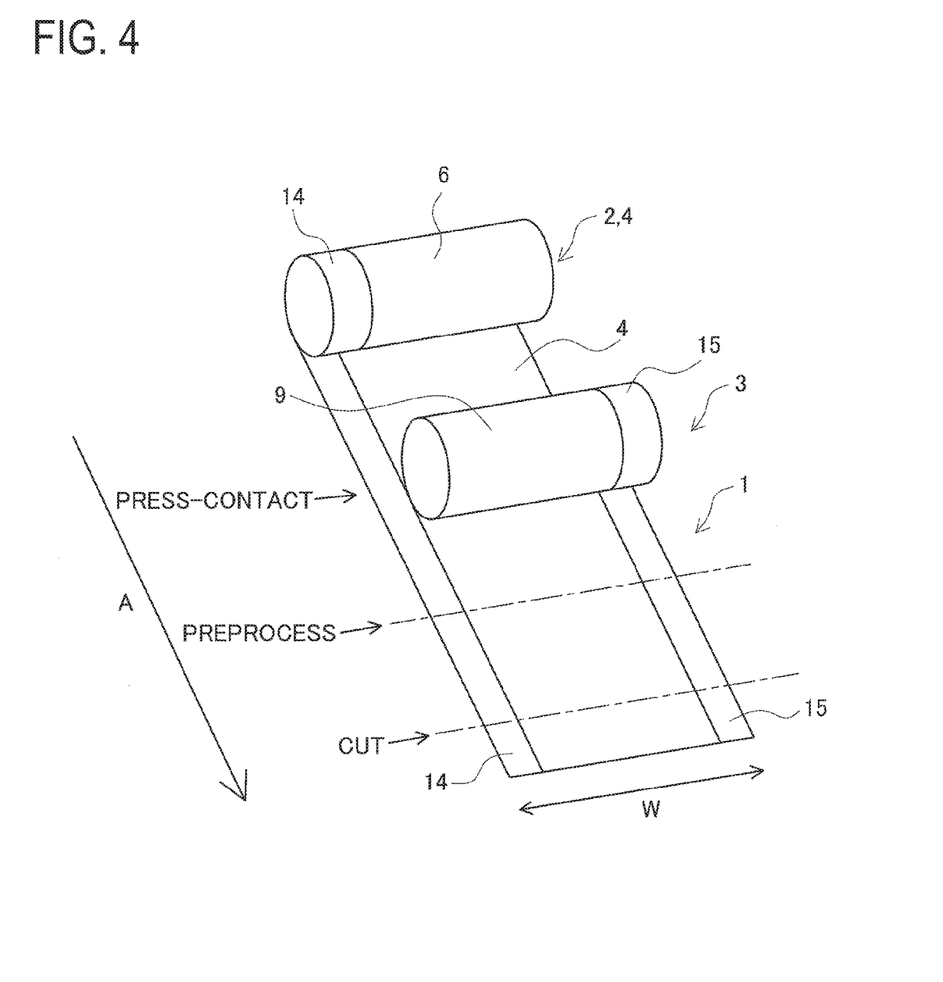
FIG. 4 is a perspective view showing a process of manufacturing an electrode body of the present embodiment.

FIG. 4 is a perspective view for explaining an overview of a manufacturing method of the electrode body in the present embodiment. As shown in FIG. 4, the negative electrode plate 2 formed with the separator layer 4 and the positive electrode plate 3 are press-contacted to form the integrated electrode plate 1. The thus formed integrated electrode plate 1 is conveyed in a conveyance direction indicated with an arrow A and locally subjected to preprocessing and cutting. Cutting is carried out for the very portion which has been performed with preprocessing in the integrated electrode plate 1. Detailed explanation of preprocessing will be mentioned below. The negative electrode plate 2 is provided with an uncoated portion 14 on its one end side in a widthwise direction, and this uncoated portion 14 does not include the negative electrode mixture layers 6. Similarly, the positive electrode plate 3 is provided with an uncoated portion 15 which does not include positive electrode mixture layers 9. The uncoated portion 14 of the negative electrode plate 2 and the uncoated portion 15 of the positive electrode plate 3 are positioned on opposite sides in the widthwise direction. In press-contacting the electrode plate, a portion stuck with the negative electrode mixture layers 6 and a portion stuck with the positive electrode mixture layers 9 are overlapped. Naturally, the separator layer 4 exists between those press-contacted portions of the electrode plates. As a result, in the form of the integrated electrode plate 1, the uncoated portions 14 and 15 are positioned on both ends in the widthwise direction of the electrode plate 1.

Figure 5:
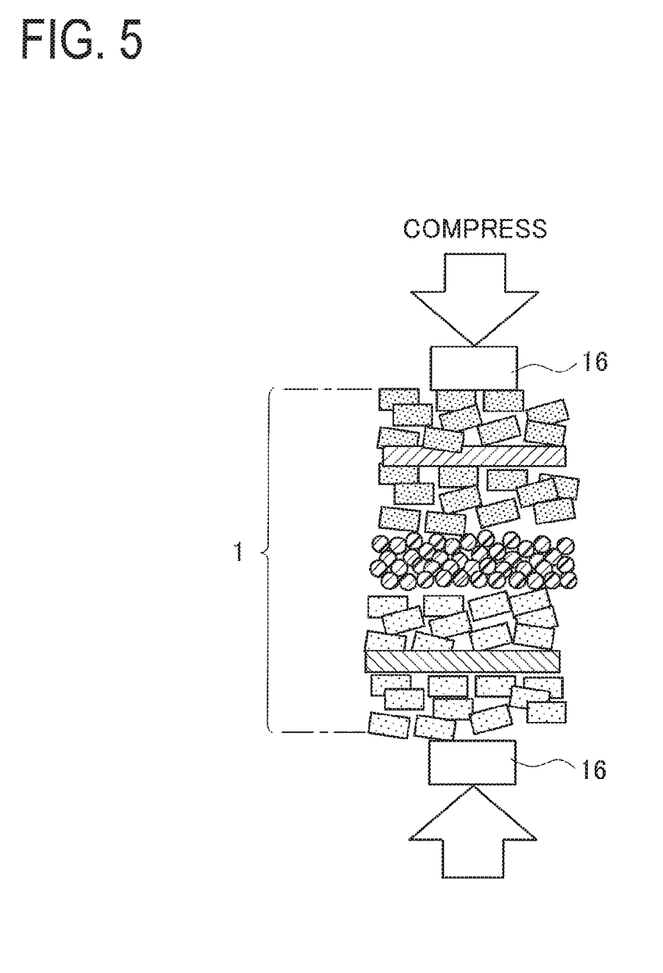
FIG. 5 is a sectional view for explaining a preprocessing step.

The preprocessing step is explained with reference to FIG. 5. As shown in FIG. 5, in the preprocessing step, the integrated electrode plate 1 is compressed in a thickness direction by a pressurizing pad 16. FIG. 5 is a sectional view taken along a plane parallel to a longitudinal direction (the conveyance direction indicated with the arrow A in FIG. 4) of the integrated electrode plate 1. Specifically, the compression process shown in FIG. 5 is not performed uniformly over the entire plane of the integrated electrode plate 1, but performed locally on a predetermined portion in the longitudinal direction. The portion applied with the compression process is a portion to be cut which is an object to be cut in the subsequent cutting step. With respect to the widthwise direction (indicated with an arrow W in FIG. 4), an object for compression in the preprocessing step is at least the entire region of the integrated electrode plate 1 in which the negative electrode mixture layers 6, the positive electrode mixture layers 9, and the separator layer 4 exist.

Figure 6:
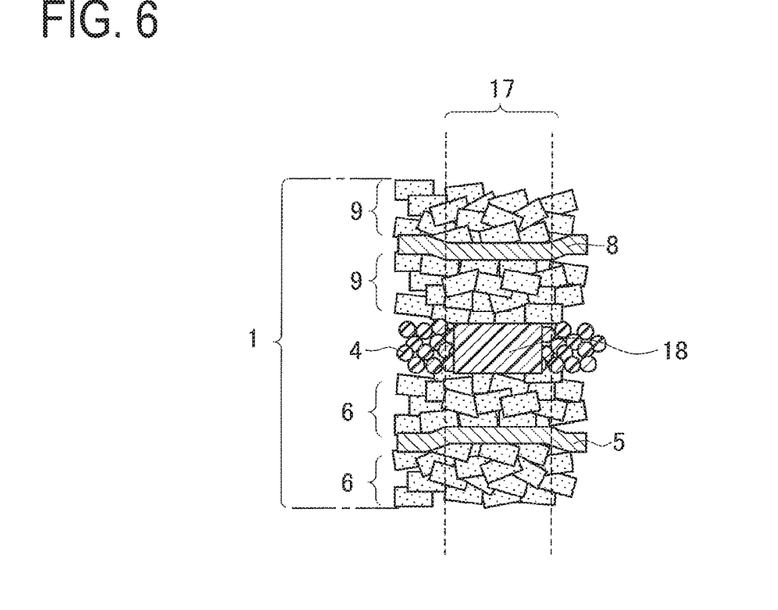
FIG. 6 is a sectional view showing a preprocessed portion of the integrated electrode plate.

As a result of compression, in a compressed portion 17, a porous portion has become more compact (more dense) as shown in FIG. 6 than that in a pre-compressed state. The porous portion includes the separator layer 4, the negative electrode mixture layer 6, and the positive electrode mixture layer 9. In other words, volume porosities in those layers are lowered by performing the preprocessing step. Especially in the separator layer 4, the resin particles 11 are mostly connected with one another. This portion of the separator layer 4 is indicated as a highly dense portion 18 in FIG. 6. Further, in the preprocessing step, not only compressing the integrated electrode plate 1, the electrode plate 1 may be heated at a temperature equal to or higher than a melting point of the resin particles 11. The pressurizing pad 16 may be embedded with a heater mechanism. When this heater mechanism in the pressurizing pad 16 is used, the integrated electrode plate 1 is heated by the pressurizing pad 16, and thus the resin particles 11 are compressed in a softened state.

Figure 7:
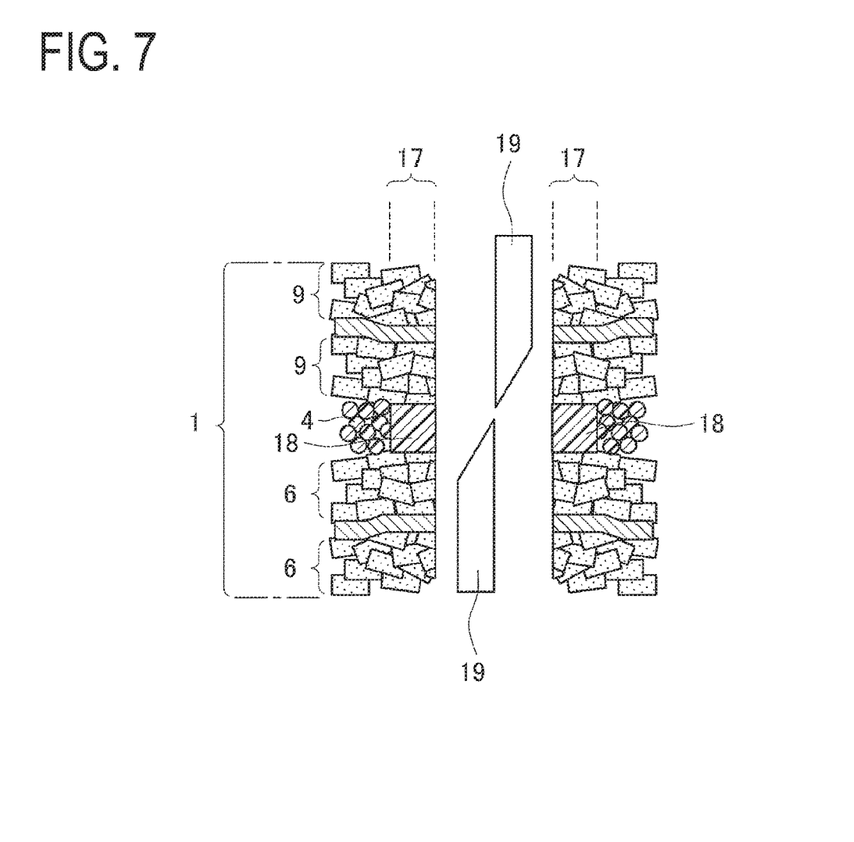
FIG. 7 is a sectional view for explaining a cutting step.

Subsequently, in the cutting step, the integrated electrode plate 1 is cut by a cutting blade 19 as shown in FIG. 7. Namely, the negative electrode plate 2 and the positive electrode plate 3 configuring the integrated electrode plate 1 are cut at one time. Cutting is naturally preformed within a range of the compressed portion 17. As shown in FIG. 7, the integrated electrode plate 1 is cut to be separated into left and right two parts in FIG. 7 without breaking its layer structure. The layer structure is not broken because the separator layer 4, the negative electrode mixture layers 6, and the positive electrode mixture layers 9 are lowered their volume porosities in the compressed portion 17 as mentioned above. In other words, fragility in those layers is lowered, and therefore those layers are hardly broken even if the layers are subjected to stress during cutting. Accordingly, the separator layer 4 (especially its highly dense portion 18) remains unbroken even in the cut portion of the integrated electrode plate 1 after cutting. This separator layer 4 prevents direct contact of the negative electrode mixture layer 6 and the positive electrode mixture layer 9.

Figure 8:
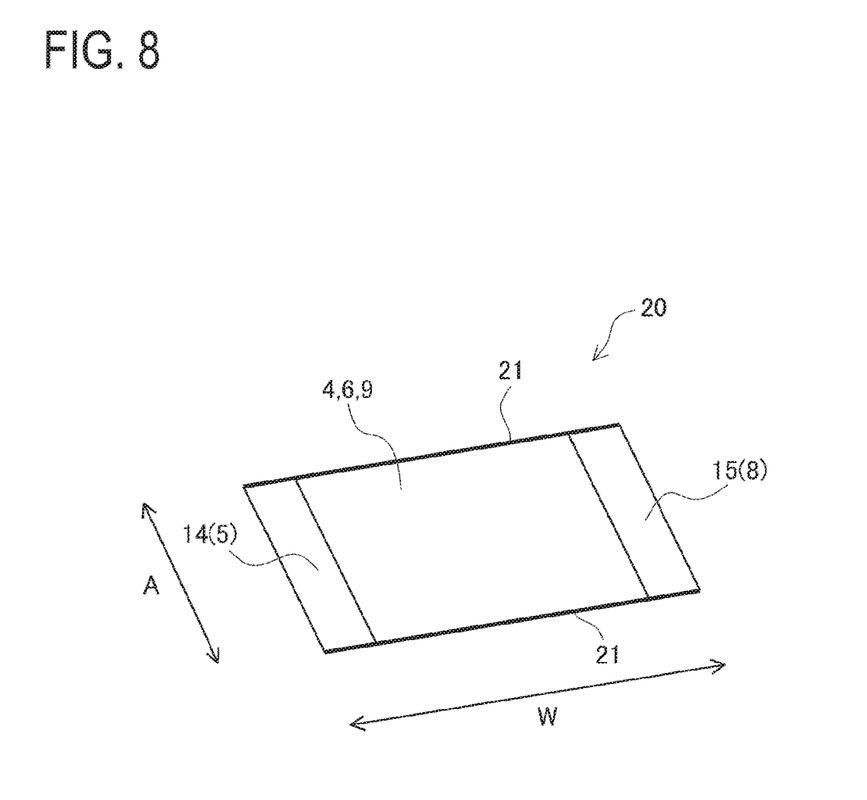
FIG. 8 is a perspective view showing an integrated electrode plate which is cut in a card-like shape through the preprocessing step and the cutting step.

A plurality of portions in the longitudinal direction (in the direction indicated with the arrow A in FIG. 4) of the integrated electrode plate 1 are periodically performed with the above mentioned preprocessing step and the cutting step. As a result of performing these steps, an integrated electrode plate 20 cut in a card-like shape is obtained as shown in FIG. 8. The card-like integrated electrode plate 20 has end portions 21 parallel to the widthwise direction W, and those end portions 21 are the portions which have been applied with the preprocessing step and the cutting step. This card-like integrated electrode plate 20 is a structure having some rigidity as a whole.

Figure 9:
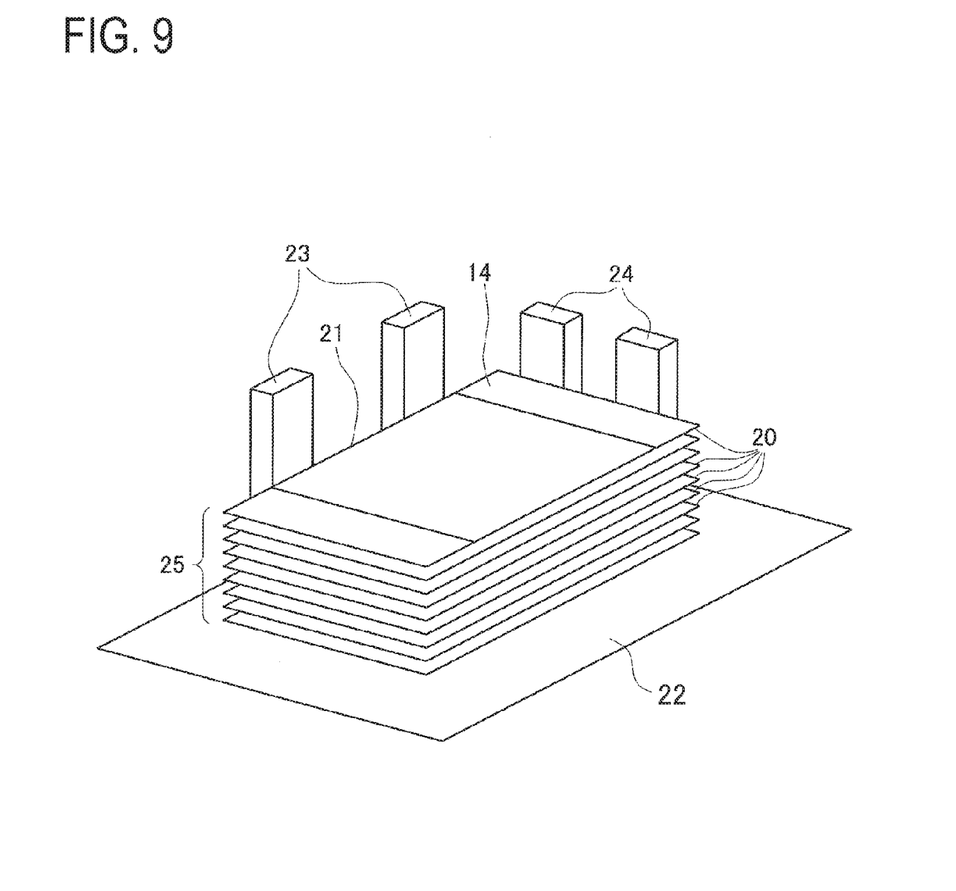
FIG. 9 is a perspective view showing a state in which the card-like integrated electrode plates are piled up on a setting table.

This card-like integrated electrode plate 20 may function as a battery even in one piece by immersing the plate in an electrolyte. However, in typical cases, a plurality of the integrated electrode plates 20 are laminated to form an electrode laminated body and then housed in a battery case. A plurality of the above mentioned card-like integrated electrode plates 20 may also be laminated in the thickness direction for use as shown in FIG. 9. A setting table 22 in FIG. 9 is provided with position alignment targets 23 and 24. The position alignment targets 23 are portions to which one of the end portions 21 of the card-like integrated electrode plate 20 will be pushed. The position alignment targets 24 are portions to which an edge of either one of the uncoated portions 14 and 15 of the integrated electrode plate 20 will be pushed. In an example of FIG. 9, the edge of the uncoated portion 14 is pushed against the position alignment targets 24.

A plurality of integrated electrode plates 20 can be thus easily aligned and piled up on the setting table 22. Alignment of the integrated electrode plates 20 by the position alignment targets 23 and 24 is made such easily because each integrated electrode plate 20 has some rigidity as a whole. This is the difference from employment of a very soft material such as a separator film which cannot be aligned by pushing against the position alignment targets.

The thus piled plural integrated electrode plates 20 on the setting table 22 are integrated by binding or bonding to obtain a laminated-type electrode body 25 in which a plurality of integrated electrode plates 20 are laminated. The thus obtained laminated-type electrode body 25 has an advantage of having high energy density higher than a conventional product. In the manufacturing process of the electrode body 25, as mentioned above, each one piece of the negative electrode plate 2 and the positive electrode plate 3 are stuck or pasted to be formed as the integrated electrode plate 1 in advance, and then this integrated electrode plate 1 is performed with the cutting step to be cut in one time. Accordingly, the electrode body 25 has no phase differences between the positive and negative electrodes. The electrode body 25 has therefore remarkably little dead portion in which an electrode active material does not contribute to battery reaction. Such electrode body 25 is appropriately attached with a current collecting terminal and housed in a battery case with the electrolyte, and thus a battery is manufactured.

The preprocessed compressed portion 17 hardly contributes to the battery reaction since the separator layer 4 has become the highly dense portion 18 and cannot be deemed to be in the porous structure. However, the proportion of the compressed portion 17 accounting for the entire card-like integrated electrode plate 20 is remarkably small as compared to the conventional dead portion formed by the phase differences, and thus the compressed portion 17 is hardly problematic. Preprocessing to prevent collapse in the layer structure in the cutting portion also contributes to increase in the energy density of the electrode body 25.

Figure 10:
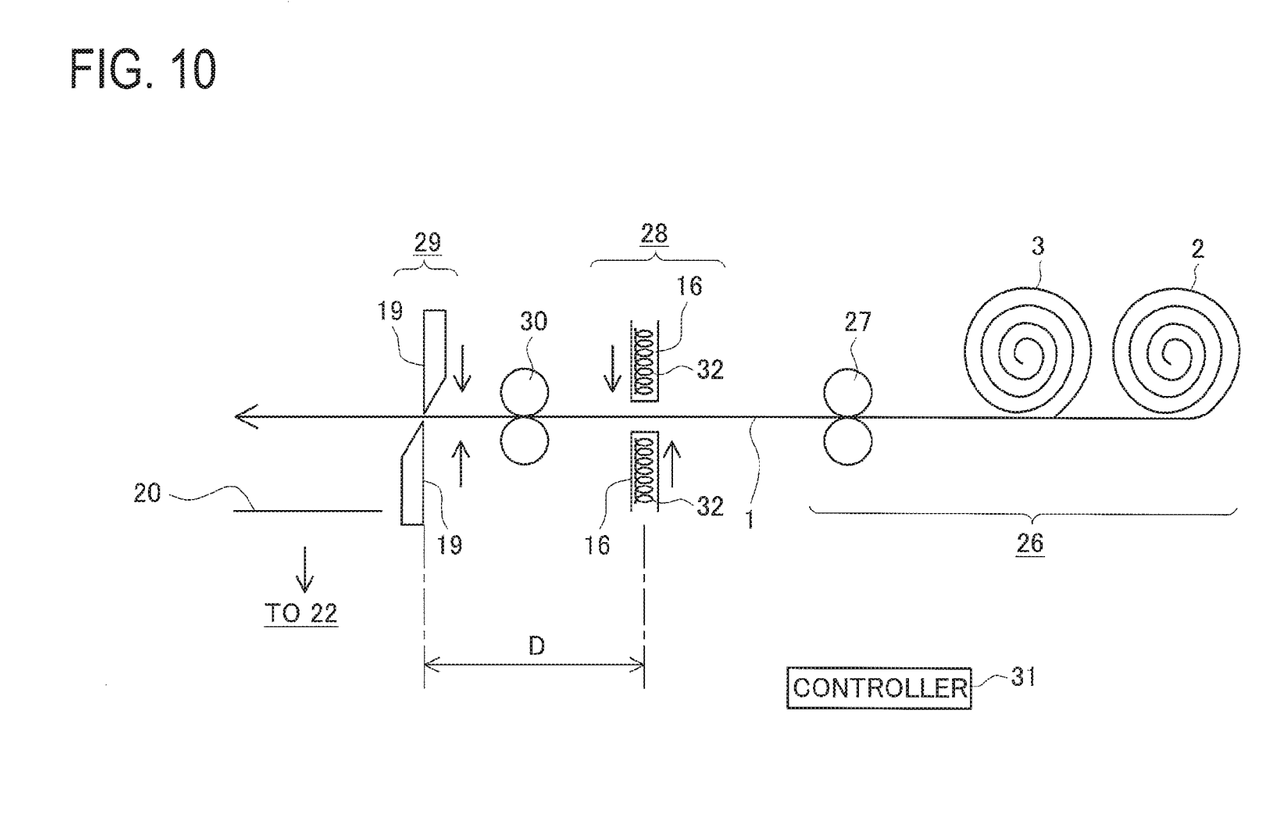
FIG. 10 is a configurational view showing an apparatus for manufacturing the electrode body of the present embodiment.

FIG. 10 shows a configurational example of an apparatus to perform the manufacturing process for manufacturing the above mentioned card-like integrated electrode plate 20 and the electrode body 25. In the manufacturing apparatus in FIG. 10, a feeding part 26 is placed on a right end in the figure. The feeding part 26 is provided with coils each wound with the negative electrode plate 2 and the positive electrode plate 3. Either one or both of them is formed with the separator layer 4. The feeding part 26 is further provided with a press-contact roller 27 to press-contact and integrate the negative electrode plate 2 and the positive electrode plate 3. The long-strip shaped integrated electrode plate 1 is configured to be fed through this feeding part 26.

In FIG. 10, on the directly downstream side of the feeding part 26, a preprocessing part 28 is provided. The preprocessing part 28 is provided with the pressurizing pad 16 shown in FIG. 5. In the preprocessing part 28, the above mentioned preprocessing step is to be carried out. In the example of FIG. 10, the pressurizing pad 16 is embedded with heaters 32. On the further downstream side of the preprocessing part 28, a cutting part 29 is provided. The cutting part 29 is provided with a cutting blade 19 shown in FIG. 7. In the cutting part 29, the above mentioned cutting step is to be carried out. Further downstream side below the cutting part 29 is provided with the setting table 22 shown in FIG. 9. Thus, the integrated electrode plate 20 cut in a card-like shape in the cutting part 29 is piled up on this setting table 22 to obtain the electrode body 25.

Also in FIG. 10, a conveyance roller 30 is provided between the preprocessing part 28 and the cutting part 29. The conveyance roller 30 is a driving force transmission member to convey the integrated electrode plate 1 in a leftward direction in the figure. The manufacturing apparatus in FIG. 10 is provided with a controller 31. The controller 31 is configured to control the conveyance roller 30 to convey the integrated electrode plate 1. The controller 31 is also configured to control operation of the preprocessing part 28 and the cutting part 29.

To be specific, the controller 31 controls the conveyance roller 30 to rotate so that the negative electrode plate 2 and the positive electrode plate 3 are each taken out of the coils and then fed out through the feeding part 26 as the integrated electrode plate 1. Subsequently, when the portion to be cut in the integrated electrode plate 1 reaches the preprocessing part 28, the conveyance of the integrated electrode plate 1 is once stopped. The preprocessing is performed by the pressurizing pad 16 in this part 28. The integrated electrode plate 1 is further conveyed until the preprocessed portion reaches the cutting part 29. In the cutting part 29, cutting by the cutting blade 19 is carried out. The integrated electrode plate 20 is cut to be in a card-like shape, and then aligned its position on the setting table 22 to be laminated.

In the above explanation, the position of the conveyance roller 30 is not limited to the one indicated in the figure, and may be anywhere within a range from the press-contact roller 27 to the cutting part 29 where the roller 30 does not interfere with any other components. As one alternative, the press-contact roller 27 may be configured to serve as the conveyance roller 30. Further, it is more preferable that a distance D between the pressurizing pad 16 and the cutting blade 19 agrees with a length in the arrow A direction (the longitudinal direction A in FIG. 4) of the card-like integrated electrode plate 20 in FIG. 8. This agreement enables simultaneous operation of preprocessing in the preprocessing part 28 and cutting in the cutting part 29. As one alternative, the distance D may be variable to be advantageous in response to a demand for a wide variety of products. The form of the integrated electrode plate 1 in which the negative electrode plate 2 and the positive electrode plate 3 are integrated may be transacted on the market. Consequently, if the integrated electrode plate 1 which has been integrally formed is obtained, the press-contact step may not be performed in the manufacturing apparatus in FIG. 10.

EXAMPLES

Figure 11:
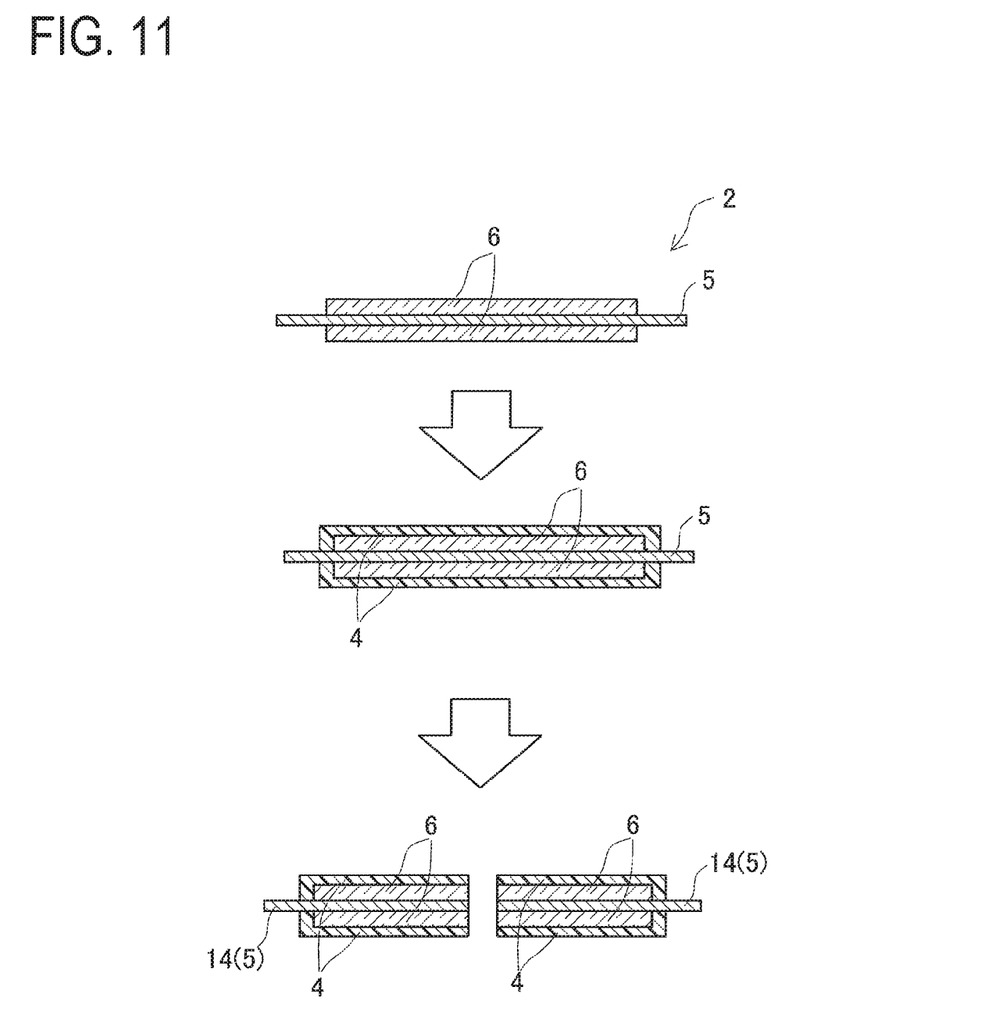
FIG. 11 a sectional view showing a process of forming the separator layer on the negative electrode plate in the present example.
Figure 12:
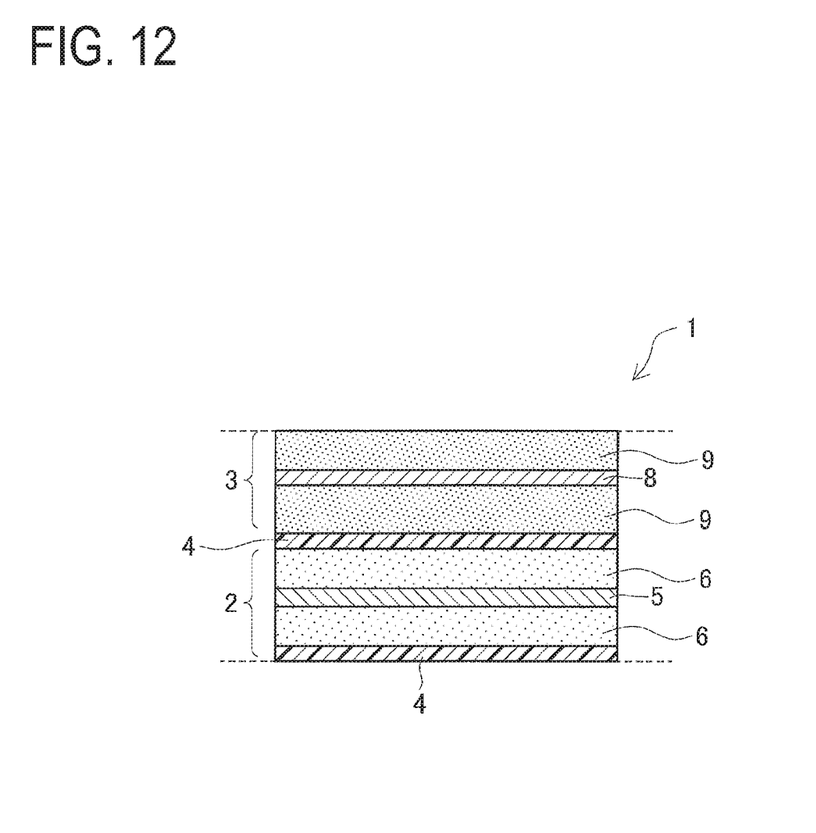
FIG. 12 is a sectional view showing a layer structure of the integrated electrode plate used in the present example.

Examples and comparative examples are explained below. In the present examples and the comparative examples, both surfaces of the negative electrode plate 2 are formed with the separator layers 4, and the thus formed negative electrode plate 2 and the positive electrode plate 3 having no separator layer 4 are used for producing the integrated electrode plate 1. Specifically, as shown in FIG. 11, the negative electrode plate 2 having a width accounting for two pieces of the negative electrode plates as products is used as a starting material. On both surfaces of the negative electrode mixture layers 6 of this negative electrode plate 2, the separator layers 4 are formed. The entire negative electrode mixture layers 6 are covered by the separator layers 4, but a large part of the uncoated portion 14 of the negative current collecting foil 5 is made not to be covered by the separator layers 4 but to remain exposed. This negative electrode plate is cut in the longitudinal direction at a center in the widthwise direction, and thus two pieces of the negative electrode plates 2 formed with the separator layers 4 are obtained. This cutting operation in the longitudinal direction may also be applied with the above mentioned preprocessing. The positive electrode plate 3 is formed similarly to the above in a way that a material having a width accounting for two pieces is cut at its center to obtain two pieces of the positive electrode plates 3. In the present and comparative examples, the integrated electrode plate 1 having the sectional structure shown in FIG. 12 is produced and performed with a test explained below. The integrated electrode plate 1 in FIG. 12 includes the separator layers 4 on the surface on the negative electrode plate 2 side as well as between the negative electrode plate 2 and the positive electrode plate 3.

Formation of the above mentioned separator layer 4 is made under the following conditions in the present and comparative examples. As a coating material, a liquid mixture of a water dispersion of polyethylene particles (hereinafter, referred to PE dispersion) and CMC (carboxymethyl cellulose) as a thickener as indicated below are used.

PE dispersion: "Chemipearl W300" by Mitsui Chemicals, Inc., at 99.8 pts.wt.
Thickener: "SUNROSE MAC 350" by Nippon Paper Industries Co., Ltd. at 0.2 pts. wt.
Conditions for the coating process is set as follows.
Type of a coating apparatus: a gravure roller type, and
Coating thickness: 25 μm.
As materials for the negative electrode plate 2 and the positive electrode plate 3, the following ones are used.
Negative electrode plate:
Negative current collecting foil: copper foil;
Negative active material: graphite.
Positive electrode plate:
Positive current collecting foil: aluminum foil;
Positive active material: lithium-nickel-cobalt-manganese composite oxide.

Figure 13:
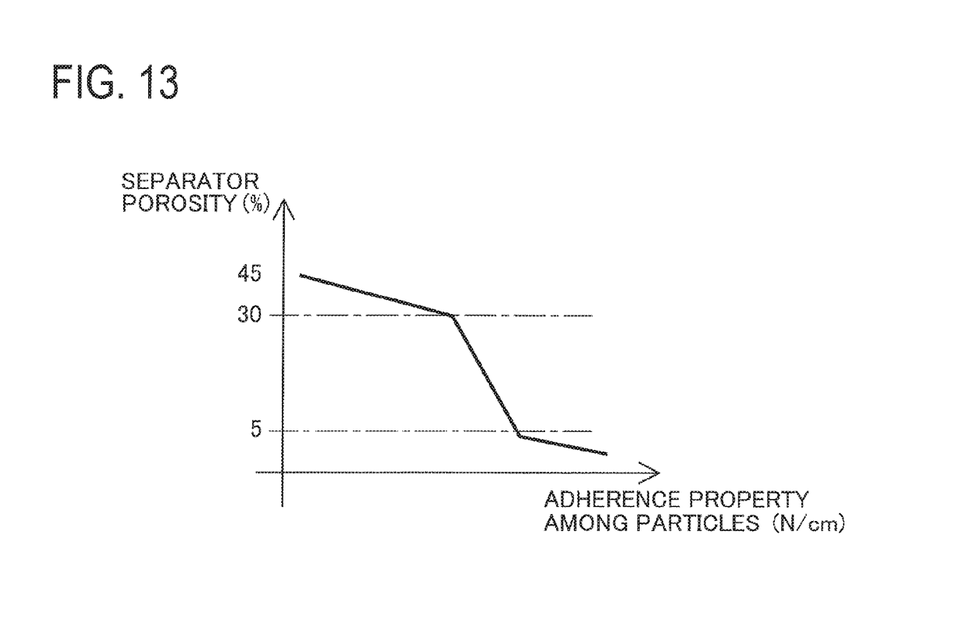
FIG. 13 is a graph showing a relationship between a volume porosity and the adherence property among particles in the separator layer.
Figure 14:
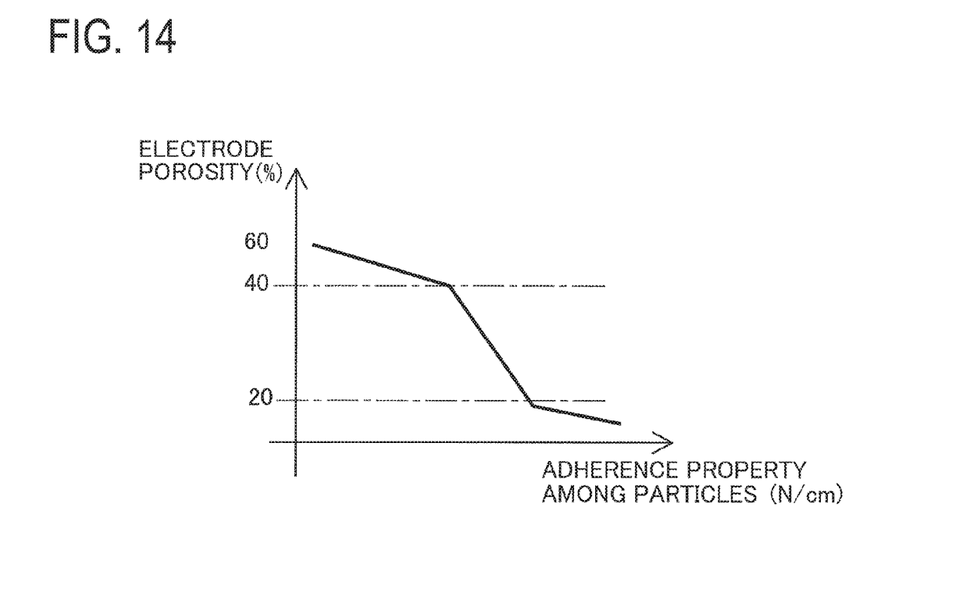
FIG. 14 is a graph showing a relationship between a volume porosity and the adherence property among particles in positive and negative electrode mixture layers.

The separator layer 4, the negative electrode mixture layer 6, and the positive electrode mixture layer 9 of the integrated electrode plate 1 are porous as mentioned above, and each of them includes cavities inside. It is known that, as a proportion of the volume of the cavities over the volume of the layer (a volume porosity) is low, the adherence property among the particles configuring the layer is confirmed to be high. FIGS. 13 and 14 are graphs indicating this relationship. As shown in FIG. 13, in the case of the separator layer 4, when the volume porosity of the separator layer 4 is 5% or less, the adherence property among the particles is remarkably large. In the case of the negative electrode mixture layer 6 and the positive electrode mixture layer 9, as shown in FIG. 14, when the volume porosity is 20% or less, the adherence property among the particles is remarkably large.

On the contrary, a volume porosity of the typically-produced integrated electrode plate 1 is 30 to 45% in the separator layer 4 and 40 to 60% both in the negative electrode mixture layer 6 and the positive electrode mixture layer 9, which are higher than the above mentioned ranges. In other words, the typically-produced integrated electrode plate 1 is weak in the adherence property among the particles in each porous layer. In short, each layer is fragile. The present embodiment has been made to address this problem, and the preprocessing step is carried out prior to cutting so that the volume porosity in each porous layer is lowered to be within the above range. Thus, each porous layer is strengthened to an extent not to be broken in the cutting step. The volume porosity in each porous layer can be calculated from a photographed sectional image taken by a scanning electron microscope (SEM). To be more specific, the volume porosity is calculated from a separately measured weight per unit (mg/cm$^2$) in each layer, a density (mg/cm$^3$) of each configurational particle as a known value, and a thickness measured on a sectional image.

TABLE 1

|  | Heating temperature (° C.) | Load (MPa) | Separator porosity (%) | Electrode porosity (%) | Insulation resistance (MΩ) | Determination result |
|---|---|---|---|---|---|---|
| Comp. Ex. 1 | — |  | 40 | 50 | 0.21 | x |
| Comp. Ex. 2 | 130 | 10 | 6 | 10 | 0.81 |  |
| Comp. Ex. 3 | 125 | 6.8 | 7 | 25 | 0.73 |  |
| Example 1 | 150 | 10 | 0 | 10 | 17.9 | o |
| Example 2 |  | 7.1 |  | 20 | 16.7 |  |
| Example 3 | 145 | 10 | 5 | 10 | 15.1 |  |
| Example 4 |  | 7.1 |  | 20 | 14.8 |  |
| Example 5 | 148 | 8.3 | 3 | 15 | 16.4 |  |
| Example 6 | 23 (Room temperature) | 15 | 4 | 19 | 14.5 |  |
| Example 7 |  | 20 | 2 | 16 | 15.6 |  |
| Example 8 |  | 30 | 1 | 11 | 17.3 |  |

Examples and comparative examples are prepared by variously changing conditions for preprocessing. Detailed conditions are shown in a table 1, and each section in a topmost row of the table is specifically indicated as follows.

Heating temperature: a setting temperature of the pressurizing pad 16 in the preprocessing step.

Load: a pressing load applied by the pressurizing pad 16 to the integrated electrode plate 1 in the preprocessing step.

Separator porosity: a volume porosity of the separator layer 4 in the compressed portion 17 after the preprocessing step.

Electrode porosity: a volume porosity of the negative electrode mixture layer 6 and the positive electrode mixture layer 9 in the compressed portion 17 after the preprocessing step.

Insulation resistance: a resistance value of the electrode body 25 by the application of 500V after the cutting step and the laminating step.

Determination result: when the insulation resistance value exceeds 1 MΩ, the corresponding section is indicated with a sign "o" (determined to be acceptable), and when the insulation resistance value is 1 MΩ or less, the corresponding section is indicated with a sign "x" (determined to be failure).

Figure 15:
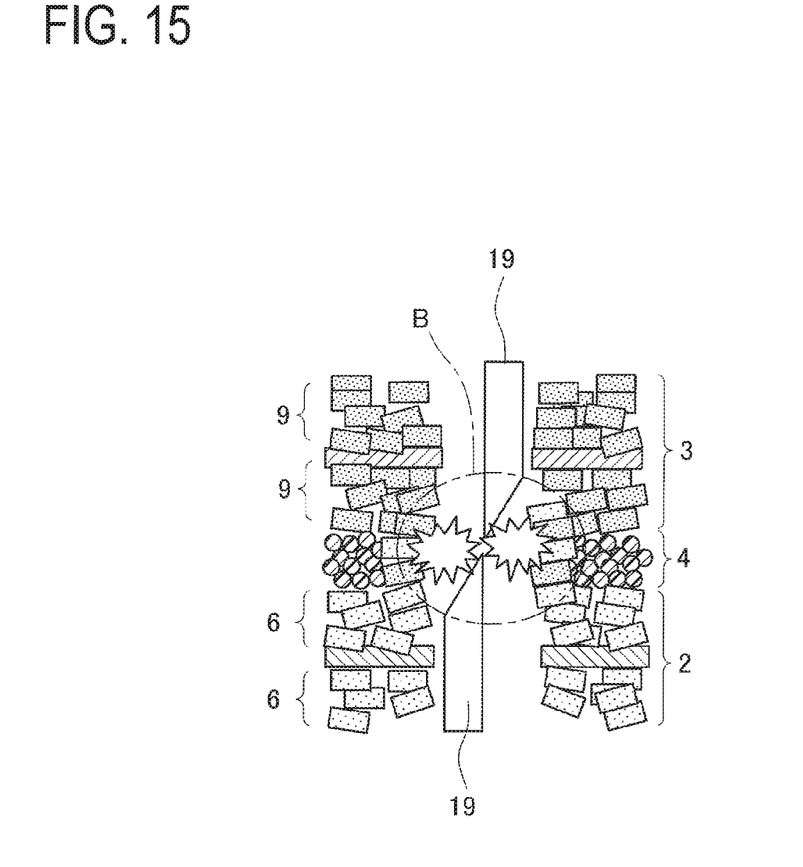
FIG. 15 is a sectional view of a cut portion and its vicinity in a comparative example in which the preprocessing step is not performed but the cutting step is performed.

The comparative example 1 is not performed with the preprocessing step. The values in sections "Separator porosity" and "Electrode porosity" of the comparative example 1 correspond to the values of the case that the preprocessing step is not performed. Those values correspond to the values at the time before performing the preprocessing step in other comparative examples and examples, and those values are remarkably higher than the values of other comparative examples and examples in the table 1. In the comparative example 1, the value of "Insulation resistance" is considerably low (determined to be failure, which is labeled as "x" in the table). Such low value means that the insulation property between the positive electrode and the negative electrode is low. Only the cutting step is performed without performing the preprocessing step, and therefore the separator layer 4, the negative electrode mixture layer 6 adjacent to the separator layer 4, and the positive electrode mixture layer 9 in the cut portion are conceived to be broken to pieces as shown in a region B in FIG. 15. This collapse in the cut portion leads to physical minute short circuit between the positive and negative electrodes, and the insulation resistance is conceived to become low due to this short circuit.

The comparative examples 2 and 3 are performed with the preprocessing step, but still the insulation resistance in each example is low and the result is labeled as "x." In the comparative examples 2 and 3, "Heating temperature" does not reach 135° C. which is a melting point of polyethylene particles used for the separator layer 4. Further, "Load" in preprocessing is not so high. Therefore, at least any one of values in "Separator porosity" and "Electrode porosity" is not lowered enough to an extent that fully high adherence property among particles is obtained. The comparative examples 2 and 3 are relatively favorable than the comparative example 1, but it is conceivable that each result is still not enough to be determined as "o." In the comparative examples 1 to 3, values which are not low enough in sections of "Separator porosity" and "Electrode porosity" are indicated in an italic style.

In the examples 1 to 5, "Heating temperature" in the preprocessing step is set to be equal to or higher than the melting point of the used polyethylene particles. "Load" is set as similar to the one in the comparative examples 2 and 3. In the examples 1 to 5, the values in "Separator porosity" and "Electrode porosity" are lowered enough to obtain fully high adherence property among the particles. Accordingly, in each example, the insulation resistance is favorable and labeled as "o." Especially in the examples 1 and 2, "Heating temperature" is the highest among the examples, and "Separator porosity" is lowered to reach zero. "Heating temperature" in the examples 1 and 2 are the same, but the example 1 applying higher "Load" than the example 2 indicates higher insulation resistance value than the example 2. The same applies to a comparison of the examples 3 and 4. "Load" in the examples 1 and 3 are the same, but the example 1 applying higher "Heating temperature" indicates higher insulation resistance value than the example 3. The same applies to a comparison of the examples 2 and 4.

The examples 6 to 8 are not performed with heating of the pressurizing pad 16 but only performed with pressing in the preprocessing step. However, "Load" is increased to be larger than the comparative examples 2 and 3 and the examples 1 to 5. As similar to the examples 1 to 5, in the examples 6 to 8, the values in "Separator porosity" and "Electrode porosity" are lowered enough to obtain fully high adherence property among the particles. Accordingly, the insulation resistance in each example is favorable and labeled as "o." Further, in comparing the examples 6 to 8, the higher the value of "Load" is, the higher the insulation resistance value becomes.

As explained in detail above, according to the present embodiment and the examples, the negative electrode plate 2 and the positive electrode plate 3 are laminated with interposing the separator layer 4 as a particle accumulated layer and then integrally formed as the integrated electrode plate 1, and the integrated electrode plate 1 is used to produce the electrode body 25. Prior to cutting the integrated electrode plate 1, the portion to be cut is applied with the preprocessing step. This preprocessing operation enables to lower the porosity in each porous layer inside the integrated electrode plate 1 of the portion to be cut and thus gives rigidity rigid enough to prevent collapse of the portion arranged to be cut due to cutting. This preprocessed portion is set as a portion to be cut. As a result, there are realized a manufacturing method and a manufacturing apparatus of an electrode body enabling to appropriately prevent short circuit between the positive electrode mixture layer 9 and the negative electrode mixture layer 6 even in the cut portion while using the separator layer 4 formed by the particle accumulated layer.

The present embodiment and the examples are only made for illustration and the present disclosure is not limited to the embodiments and examples. Accordingly, various changes and modifications to the present disclosure may be made without departing from the scope of the disclosure. For example, component materials for each layer may not be the above materials as long as the materials do not go beyond the scope of the present disclosure. As one alternative, coating on the separator layer 4 may be applied to at least one side surface of both the negative electrode plate 2 and the positive electrode plate 3 other than an example of applying on the both surfaces of the negative electrode plate 2 or the positive electrode plate 3. Further, the electrode body 25 can be produced even in a case that the integrated electrode plate 1 with the layer structure having only one separator layer 4 as shown in FIG. 1 and others is used. Such electrode body 25 can be formed in a way that the card-like integrated electrode plates 20 are laminated with alternately interposing separator films, or each card-like integrated electrode plate 20 is alternately turned the other way and laminated.

In the preprocessing step, the portion to be cut is pressurized in a thickness direction of the positive electrode mixture layer, the negative electrode mixture layer, and the separator layer, thereby decreasing the volume porosity in each layer. Each layer is compressed in its thickness direction, and thus spaces formed among constituent particles in each layer are reduced.

Further preferably, in the preprocessing step, the integrated structure may be pressurized and heated at the temperature equal to or higher than the melting point of the thermoplastic resin forming the separator layer. The softened constituent particles of the separator layer is pressurized and therefore the constituent particles are more closely adhered. Accordingly, the volume porosity of the separator layer can be further lowered.

In the electrode body manufacturing method according to any one of the above mentioned aspects, preferably, preprocessing and cutting are performed for the portion to be cut in the preprocessing step and the cutting step so that the integrated structure is cut in a card like shape, and subsequently, a plurality of card-like integrated structures obtained by cutting in the cutting step are laminated in the thickness direction to form a laminated electrode body in a laminating step. The thus obtained laminated electrode body has high energy density. The integrated structure including the positive electrode mixture layer and the negative electrode mixture layer is appropriately cut, so that a dead space formed due to the phase difference between the positive and negative electrodes can be eliminated. Further, the above card-like integrated structure has rigidity as a whole, and accordingly, the card-like integrated structures can be easily aligned to be laminated.

The above mentioned manufacturing apparatus of the electrode body preferably includes a feed control part to feed a long-strip shaped integrated structure through the preprocessing part and the cutting part to be cut in a card like shape and fed out from a feeding part, and a laminating part to laminate a plurality of card-like integrated structures obtained by cutting in the cutting part in a thickness direction so that a laminated electrode body is formed, wherein the laminating part is provided with a position alignment member to which an edge part of the card-like integrated structure is pushed to align the card-like integrated structure. As mentioned above, the card-like integrated structure of the present embodiment has rigidity as a whole, and accordingly the structure can be easily aligned by pushing the structure against the position alignment member.

According to the present configuration, a manufacturing method and a manufacturing apparatus of an electrode body in which the accumulated layer of particles made of thermoplastic resin is used as the separator layer are provided and the positive electrode mixture layer and the negative electrode mixture layer can be appropriately prevented from short circuit in the cut portion of the electrode body.

REFERENCE SIGNS LIST

1 Integrated electrode body
4 Separator layer
6 Negative electrode mixture layer
11 Resin particles
16 Pressurizing pad
17 Compressed portion which is applied with preprocessing
18 Highly dense portion
19 Cutting blade
20 Card-like integrated electrode body
23 Position alignment target
24 Position alignment target
25 Electrode body
26 Feeding part
28 Preprocessing part
29 Cutting part
31 Controller
32 Heater

What is claimed is:

1. A manufacturing method of an electrode body, the electrode body comprising a positive electrode mixture layer, a negative electrode mixture layer, and a thermoplastic-resin separator layer placed therebetween, wherein the manufacturing method includes:

a feeding step of feeding a long-strip shaped integrated structure comprising the positive electrode mixture layer, the negative electrode mixture layer, and the separator layer formed by accumulation of thermoplastic-resin particles, the separator layer being placed at least between the positive and negative mixture layers;

a preprocessing step of preprocessing a portion to be cut in the long-strip shaped integrated structure such that an initial volume porosity of the positive electrode mixture layer is lowered to a volume porosity of 10 to 20%, an initial volume porosity of the negative electrode mixture layer is lowered to a volume porosity of 10 to 20%, and an initial volume porosity of the separator layer is lowered to a volume porosity of 5% or less; and a cutting step of cutting the portion of the long-strip shaped integrated structure by a cutting blade.

2. The manufacturing method of the electrode body according to claim 1, wherein the preprocessing step is performed such that the portion to be cut is pressurized in a thickness direction of the positive electrode mixture layer, the negative electrode mixture layer, and the separator layer to lower the initial volume porosity in each layer.

3. The manufacturing method of the electrode body according to claim 2, wherein the preprocessing step is preformed such that the integrated structure is heated and pressurized at a temperature equal to or more than a melting point of the thermoplastic resin of the separator layer.

4. The manufacturing method of the electrode body according to claim 1, wherein
the portion to be cut is preprocessed and cut through the preprocessing step and the cutting step so that the integrated structure is cut in a card like shape, and
the method further includes a laminating step of laminating a plurality of card-like integrated structures obtained by the cutting in the cutting step in a thickness direction to form a laminated electrode body.

5. The manufacturing method of the electrode body according to claim 2, wherein
the portion to be cut is preprocessed and cut through the preprocessing step and the cutting step so that the integrated structure is cut in a card like shape, and
the method further includes a laminating step of laminating a plurality of card-like integrated structures obtained by the cutting in the cutting step in a thickness direction to form a laminated electrode body.

6. The manufacturing method of the electrode body according to claim 3, wherein
the portion to be cut is preprocessed and cut through the preprocessing step and the cutting step so that the integrated structure is cut in a card like shape, and
the method further includes a laminating step of laminating a plurality of card-like integrated structures obtained by the cutting in the cutting step in a thickness direction to form a laminated electrode body.

* * * * *